(12) United States Patent
Murashige et al.

(10) Patent No.: US 12,311,645 B2
(45) Date of Patent: *May 27, 2025

(54) GLASS FILM-RESIN COMPOSITE

(71) Applicant: NITTO DENKO CORPORATION, Ibaraki (JP)

(72) Inventors: Takeshi Murashige, Ibaraki (JP); Junichi Inagaki, Ibaraki (JP); Kazuhito Hosokawa, Ibaraki (JP); Kota Nakai, Ibaraki (JP); Toshihiro Kanno, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,071

(22) Filed: Aug. 28, 2023

(65) Prior Publication Data
US 2023/0405966 A1 Dec. 21, 2023

Related U.S. Application Data

(63) Continuation of application No. 16/345,579, filed as application No. PCT/JP2017/038352 on Oct. 24, 2017, now Pat. No. 11,738,534.

(30) Foreign Application Priority Data

Oct. 26, 2016 (JP) .................................. 2016-209751

(51) Int. Cl.
*B32B 17/06* (2006.01)
*B32B 3/14* (2006.01)
(Continued)

(52) U.S. Cl.
CPC .................. *B32B 3/14* (2013.01); *B32B 7/14* (2013.01); *B32B 17/10* (2013.01); *C03B 40/033* (2013.01);
(Continued)

(58) Field of Classification Search
CPC .................................................... B32B 2250/02
(Continued)

(56) References Cited

U.S. PATENT DOCUMENTS 8,525,405 B2 9/2013 Kuwabara et al.
9,321,677 B2 * 4/2016 Chang .................. G06F 1/1652
(Continued)

FOREIGN PATENT DOCUMENTS

CN 104220253 A 12/2014
EP 2 332 856 A1 6/2011
(Continued)

OTHER PUBLICATIONS

SGP (http://www.sgpinc.com).*
(Continued)

*Primary Examiner* — Lauren R Colgan
(74) *Attorney, Agent, or Firm* — Hauptman Ham, LLP

(57) ABSTRACT

Provided is a glass film-resin composite which makes it possible to obtain a long-length (e.g., 500 m or more-long) glass roll. The glass film-resin composite comprises a glass film, and a resin tape laminated to at least one surface of the glass film through an adhesive, wherein the width l (mm) of the resin tape satisfies the following formula (1).

$$l \equiv a \frac{E_g \sqrt{t_g}}{E_p t_p} \quad (1)$$

(where: a represents a reinforcement coefficient (mm*(μm)$^{1/2}$) which is 1.10 or more; Eg represents the Young's modulus (GPa) of the glass film; Ep represents the Young's
(Continued)

modulus (GPa) of the resin tape; tg represents the thickness (μm) of the glass film; and tp represents the thickness (μm) of the resin tape.).

10 Claims, 1 Drawing Sheet

(51) Int. Cl.
    *B32B 7/14*     (2006.01)
    *B32B 15/04*     (2006.01)
    *B32B 17/10*     (2006.01)
    *C03B 40/033*     (2006.01)
    *C03C 17/32*     (2006.01)
    *C09J 201/00*     (2006.01)

(52) U.S. Cl.
    CPC .............. *C03C 17/32* (2013.01); *C09J 201/00* (2013.01); *B32B 2250/02* (2013.01); *B32B 2405/00* (2013.01)

(58) Field of Classification Search
    USPC .......................................................... 428/426
    See application file for complete search history.

(56) References Cited

U.S. PATENT DOCUMENTS

| | | | |
|---|---|---|---|
| 11,738,534 B2* | 8/2023 | Murashige ............ | C03B 40/033 428/426 |
| 2010/0192634 A1 | 8/2010 | Higuchi et al. | |
| 2011/0023548 A1 | 2/2011 | Garner et al. | |
| 2011/0114160 A1* | 5/2011 | Murashige ............ | G02F 1/1333 136/252 |
| 2011/0177290 A1 | 7/2011 | Tomamoto et al. | |
| 2011/0177325 A1 | 7/2011 | Tomamoto et al. | |
| 2011/0177347 A1 | 7/2011 | Tomamoto et al. | |
| 2011/0192878 A1* | 8/2011 | Teranishi ............... | B65H 16/00 428/428 |
| 2011/0200812 A1 | 8/2011 | Tomamoto et al. | |
| 2011/0244225 A1* | 10/2011 | Hattori ................. | C03C 17/3678 427/302 |
| 2012/0156439 A1* | 6/2012 | Mori ......................... | B32B 7/06 156/99 |
| 2012/0196103 A1* | 8/2012 | Murashige .......... | C03C 17/3405 156/60 |
| 2012/0237779 A1* | 9/2012 | Teranishi ............. | B65D 85/672 65/106 |
| 2012/0258584 A1 | 10/2012 | Garner et al. | |
| 2013/0044282 A1 | 2/2013 | Kuwabara et al. | |
| 2014/0220309 A1 | 8/2014 | Vogt et al. | |
| 2014/0319001 A1 | 10/2014 | Tomamoto et al. | |
| 2015/0072125 A1* | 3/2015 | Murashige .......... | B32B 17/1055 156/60 |
| 2015/0197407 A1 | 7/2015 | Garner et al. | |
| 2015/0232371 A1* | 8/2015 | Murashige .............. | C03C 27/10 428/54 |
| 2016/0016746 A1 | 1/2016 | Teranishi et al. | |
| 2016/0039183 A1* | 2/2016 | Murashige .............. | B32B 17/06 156/256 |
| 2016/0214361 A1* | 7/2016 | Wakabayashi .... | B32B 17/10036 |
| 2016/0361905 A1 | 12/2016 | Yamaguchi et al. | |
| 2017/0057770 A1 | 3/2017 | Garner et al. | |
| 2019/0292086 A1 | 9/2019 | Murashige et al. | |
| 2020/0198302 A1 | 6/2020 | Murashige et al. | |

FOREIGN PATENT DOCUMENTS

| | | |
|---|---|---|
| EP | 3 533 605 A1 | 9/2019 |
| JP | 4326635 B2 | 9/2009 |
| JP | 2010-132349 A | 6/2010 |
| JP | 2013-500923 A | 1/2013 |
| JP | 2013-212633 A | 10/2013 |
| JP | 2014-97923 A | 5/2014 |
| JP | 2014-205327 A | 10/2014 |
| JP | 2015-504397 A | 2/2015 |
| JP | 5754530 B2 | 7/2015 |
| JP | 2015-174694 A | 10/2015 |
| JP | 2015174694   * | 10/2015 |
| JP | 2015-195330 A | 11/2015 |
| JP | 2015-214468 A | 12/2015 |
| TW | 201422426 A | 6/2014 |
| WO | 2015/118985 A1 | 8/2015 |
| WO | 2015/129758 A1 | 9/2015 |
| WO | 2015/174216 A1 | 11/2015 |
| WO | 2018/079343 A1 | 5/2018 |

OTHER PUBLICATIONS

International Search Report for corresponding international application PCT/JP2017/038352 mailed on Jan. 30, 2018, with an English translation.

Indian first Examination Report issued on Jan. 17, 2020 for corresponding Indian Application No. 201917018588.

English Machine translation of JP2015-174694A.

"Schott D263® Glass", Specially Glass Products (SGP), (https://www.sgpinc.com/), accessed May 5, 2020 <https://www.sgpinc.com/materials/borsilicate/d-263-glass/>.

Extended European Search Report dated Apr. 29, 2020 in connection with the counterpart European Patent Application No. EP17864039.7.

Office Action issued for corresponding Taiwanese Patent Application No. 106136693 on Apr. 7, 2021.

Office Action issued for corresponding Chinese Patent Application No. 201780066318.1 on Apr. 6, 2021, along with an English machine translation.

Office Action issued for corresponding Japanese Patent Application No. 2018-547685 on Jul. 26, 2021, along with an English machine translation.

Decision of Refusal issued on Jan. 17, 2022, for corresponding Japanese Patent Application No. 2018-547685, along with an English machine translation.

Official Action issued on Jan. 17, 2022, for European Patent Application No. 17 864 039.7.

Office Action issued on Jan. 10, 2022, for corresponding Taiwanese Patent Application No. 106136693, along with an English translation.

Office Action issued on Sep. 23, 2022, for corresponding Vietnamese patent application No. 1-2019-02620, along with an English translation (3 pages).

Decision to Grant issued on Dec. 26, 2022, for corresponding Japanese Patent Application No. 2022-067829, along with an English translation (4 pages).

\* cited by examiner

GLASS FILM-RESIN COMPOSITE

CROSS REFERENCE TO RELATED APPLICATION

This application is a Continuation of U.S. patent application Ser. No. 16/345,579 filed on Apr. 26, 2019, which is the National Phase Application of International Application No. PCT/JP2017/038352, filed on Oct. 24, 2017, which designates the United States and was published in Japan, which claims the priority of Japanese Patent Application No. 2016-209751, filed on Oct. 26, 2016, in the JPO (Japanese Patent Office). All of the aforementioned applications are hereby incorporated by reference in their entireties.

TECHNICAL FIELD

The present invention relates to a glass film-resin composite. In particular, the present invention relates to a glass film-resin composite which makes it possible to obtain a long-length (e.g., 500 m or more-long) glass roll.

BACKGROUND ART

Recent years, in the fields of display and illumination elements using a liquid crystal display element or an organic EL element, and of solar batteries, weight reduction and thickness reduction have been promoted from the viewpoint of transportability, storability, and designability, and development toward continuous production by a roll-to-roll process has also been promoted.

In such circumstance, as a way to give flexibility to glass to be used in the above elements, it is proposed to use an ultrathin (e.g., 200 µm or less-thick) glass (hereinafter also referred to as "glass film"). A glass film has flexibility, so that it is capable of being wound in the form of a roll, and thus processed through the roll-to-roll process. Heretofore, there have been disclosures about a method of subjecting a glass film to processing to form a polarizer, a transparent electrode or the like thereon through the roll-to-roll process, and others.

For example, U.S. Pat. No. 8,525,405B discloses a method of producing a display having a flexible glass layer, through the roll-to-roll process.

Meanwhile, it is known that a glass film is weak against tensile stress due to bending, and is liable to be cracked from an edge thereof. Therefore, many studies on glass film processing methods have been made.

For example, JP 2015-504397A discloses a technique of providing a glass film capable of maximally or completely preventing formation of a crack starting from an edge of the glass film by improving edge quality of the glass film sufficiently enough to enable inflection (bending) or wind-up of the glass film (by setting an average surface roughness of the glass film to 2 nm or less).

Further, with a view to providing a thin sheet glass roll which has a structure capable of allowing an unnecessary load to become less likely to act on a thin sheet glass of the roll, thereby reducing possibility of breakage or damage during handling to ensure safe transportation, JP 4326635B discloses a thin sheet glass roll in which a thin sheet glass is wound in the form of a roll together with a peelable resin film.

However, even with these conventional techniques, it has not yet been able to completely prevent breakage of glass caused by generation of cracks.

Moreover, there remains a problem regarding roll transportation, such as a problem that, when stress is applied onto the surface of a glass film of a roll due to a bending-causing contact with respect to the roll, the glass film starts to be cracked from an edge thereof.

Therefore, there has been proposed a technique of laminating a resin film to one or each of opposite surfaces of a glass film, or to each of width-directional opposite edge regions of the glass film, to thereby prevent a crack from being generated at an edge of the glass film or to prevent development of the generated crack.

For example, with a view to providing a production method for a glass-resin composite having sufficient transportability, handleability and processability even when glass is extremely thin, JP 5754530B discloses a technique of pressure-bonding a photo-curable resin film to a glass ribbon, and curing the photo-curable resin film by irradiation with ultraviolet light, to form a resin layer.

Further, with a view to preventing blocking between contact parts of a glass sheet, or the like, the pamphlet of WO 2015/118985 discloses a glass roll in which a resin coating film is formed on one surface of the glass sheet.

With a view to, even when a composite obtained by bonding a resin layer to a glass sheet is subjected to bending deformation, cutting of an edge region thereof, or the like, and a crack is formed at the resulting cut edge of the glass sheet or in the vicinity of the cut edge, preventing the crack from propagating into an effective region, the pamphlet of WO 2015/174216 discloses a technique of forming a sacrificial groove outside the effective region of the glass sheet.

JP 2015-214468A discloses a technique of bonding, to a glass sheet, a resin layer having adhesive force equivalent to a 180-degree peel strength of 1 N/25 mm or more, a Young's modulus of 100 MPa or more, and a thickness of 1 to 100 µm, thereby making it possible to cut the glass sheet while suppressing propagation of a crack formed therein.

With a view to facilitating handling and conveyance of a glass ribbon, JP 2013-500923A discloses a technique of coating an edge region of the glass ribbon with a flexible material such as an existing film, wherein the resulting coating may be bonded to the glass by an adhesive.

However, as it stands, a glass film having a long length required to be highly-efficiently subjected to processing through the roll-to-roll process, e.g., a glass film having a length of 500 m or more (preferably, 1000 m or more), has not yet been distributed to the market, i.e., has not yet been realized.

CITATION LIST

Patent Document

Patent Document 1: U.S. Pat. No. 8,525,405B
Patent Document 2: JP 2015-504397A
Patent Document 3: JP 4326635B
Patent Document 4: JP 5754530B
Patent Document 5: pamphlet of WO 2015/118985
Patent Document 6: pamphlet of WO 2015/174216
Patent Document 7: JP 2015-214468A
Patent Document 8: JP 2013-500923A

SUMMARY OF INVENTION

Technical Problem

It is an object of the present invention to provide a glass film-resin composite which makes it possible to obtain a long-length (e.g., 500 m or more-long) glass roll.

Solution to Technical Problem

As a result of diligent researches for solving the above problems, the present inventors found that, when, in a glass film-resin composite comprising a glass film and a resin tape laminated to at least one surface of the glass film through an adhesive, a reinforcement coefficient a (mm*(μm)$^{1/2}$) indicative of a relationship between the width l (mm) of the resin tape, and the Young's modulus Eg (GPa) of the glass film, the Young's modulus Ep (GPa) of the resin tape, the thickness tg (μm) of the glass film and the thickness tp (μm) of the resin tape has a given value, fracture propagation starting from a crack formed at an edge of the glass film can be halted within the resin tape, and have finally reached the present invention.

First of all, the inventors had an assumption that a mechanical competitive relationship between the glass-reinforcing resin tape and the glass film is a major factor of fracture or the suppression of fracture when inflecting the glass film. The elastic modulus, the thickness and the width in regard to the glass-reinforcing resin tape, and the elastic modulus and the thickness in regard to the glass, are considered to have an influence on the mechanical competitive relationship. These parameters are physically independent constants and can be handled as independent terms. Thus, a relational formula was derived which is capable of approximately defining the relationship by expressing one member as a product and associating two members with each other using the constant a. Although not limited to any specific theory, a physical implication of the derived relational formula can be considered as follows. When the elastic modulus and/or the thickness of the glass film become higher, a bending stress occurring on the surface of the glass is increased. Thus, it is preferable that the glass-reinforcing resin tape has a wider width. On the other hand, an increase in the elastic modulus and/or the thickness of the glass-reinforcing resin tape is expected to act to prevent fracture of the glass. Thus, the width of the glass-reinforcing resin tape defining a boundary of the fracture becomes substantially narrow. The influence of the thickness of the glass film is evaluated by raising the thickness to the ½-th power, thereby improving approximation accuracy.

Specifically, the present invention provides a glass film-resin composite which comprises a glass film, and a resin tape laminated to at least one surface of the glass film through an adhesive, wherein the width l (mm) of the resin tape satisfies the following formula (1).

$$l \equiv a \frac{E_g \sqrt{t_g}}{E_p t_p} \quad (1)$$

(where: a represents a reinforcement coefficient (mm*(μm)$^{1/2}$) which is 1.10 or more; Eg represents the Young's modulus (GPa) of the glass film; Ep represents the Young's modulus (GPa) of the resin tape; tg represents the thickness (μm) of the glass film; and tp represents the thickness (μm) of the resin tape.)

In the glass film-resin composite of the present invention, the glass film may be a glass ribbon.

In the glass film-resin composite of the present invention, a plurality of the resin tapes may be laminated such that the plurality of the resin tapes are provided in the vicinity of each of width-directional opposite edges of the glass ribbon, in spaced-apart relation to each other.

In the glass film-resin composite of the present invention, the resin tape may be laminated to the at least one surface of the glass film through an adhesive having no peelability.

In the glass film-resin composite of the present invention, the width l (mm) of the resin tape may be set to be 60 mm or less.

Preferably, in the glass film-resin composite of the present invention, the adhesive has an elastic modulus of 1 GPa or more.

Preferably, in the glass film-resin composite of the present invention, the thickness tg of the glass film is 200 μm or less.

Preferably, the glass film-resin composite of the present invention is used for producing a long-length glass roll.

Effect of Invention

In the glass film-resin composite of the present invention, fracture propagation starting from a crack formed at an edge of the glass film can be halted within the resin tape, so that it becomes possible to obtain a long-length (e.g., 500 m or more-long) glass roll.

DESCRIPTION OF EMBODIMENTS

Figure 1:
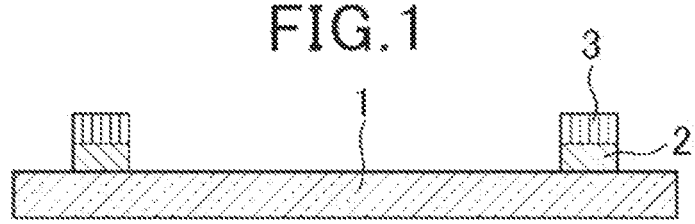
FIG. 1 is a schematic sectional view of a glass film-resin composite according to one embodiment of the present invention.

With reference to FIG. 1 which is a schematic sectional view depicting a glass film-resin composite according to one embodiment of the present invention, a glass film-resin composite according to the present invention will now be described. The glass film-resin composite according to the present invention comprises a glass film 1, and a resin tape 3 laminated to at least one surface of the glass film through an adhesive 2, In the glass film-resin composite according to the present invention, a reinforcement coefficient a (mm*(μm)$^{1/2}$) indicative of of a relationship between the width l (mm) of the resin tape, and the Young's modulus Eg (GPa) of the glass film, the Young's modulus Ep (GPa) of the resin tape, the thickness tg (μm) of the glass film and the thickness tp (μm) of the resin tape has a given value.

(Glass Film)

The glass film-resin composite according to the present invention may be produced by any suitable production method. Typically, the glass film is produced by: melting, at a temperature of 1400° C. to 1600° C., a mixture comprising a primary raw material such as silica and alumina, a defoaming agent such as mirabilite or antimony oxide, and a reducing agent such as carbon; forming the resulting melt into a thin sheet shape; and then cooling the resulting shaped body.

Examples of a forming method for the glass film include a slot down-draw process, a fusion process, and a float process. Among them, a glass film formed by the fusion process needs not be subjected to polishing, because the surface thereof is is not contaminated by tin, etc., differently from formation by the float process, and can ensure surface smoothness and thinning. From these viewpoints, it is preferable to use the fusion process.

The glass film for use in the glass film-resin composite according to the present invention has a Young's modulus Eg (GPa) and a thickness tg (μm) whose values are set such that a reinforcement coefficient a (mm*(μm)$^{1/2}$) has a given value, in relation to the width l (mm), the Young's modulus Ep (GPa) and the thickness tp (μm) of the resin tape.

The Young's modulus Eg (GPa) of the glass film is normally about 70 GPa, preferably 50 to 120 GPa, more preferably 60 to 80 GPa, still more preferably 65 to 75 GPa.

The thickness tg of the glass film is preferably 200 μm or less, more preferably 10 μm to 200 μm, still more preferably 20 μm to 150 μm, particularly preferably 30 μm to 100 μm. Here, the "thickness of the glass film" means the thickness of a portion of the glass film to which the resin tape is laminated.

The width of the glass film is preferably 50 mm to 2000 mm, more preferably 100 mm to 1500 mm.

Preferably, the glass film is preferably an elongated glass ribbon. In a case where the glass film is lengthy, the length thereof is preferably 100 m or more, more preferably 500 m or more.

Figure 2A:
FIG. 2a is a schematic sectional view of a glass film-resin composite according to another embodiment of the present invention.

Referring to FIG. 2a which is a schematic sectional view of a glass film-resin composite 1 according to another embodiment of the present invention, wherein the glass film 1 is composed of an elongated glass ribbon, a plurality of the resin tape 3 is provided by a number of at least two, wherein the at least two resin tapes 3 are laminated such that the plurality of the resin tapes are provided in the vicinity of each of width-directional opposite edges of the glass ribbon, in spaced-apart relation to each other. In this case, fracture propagation starting from a crack formed at the width-directional opposite edges of the glass ribbon can be halted within the resin tapes, so that it becomes possible to obtain a long-length (e.g., 500 m or more-long) glass roll.

Figure 2B:
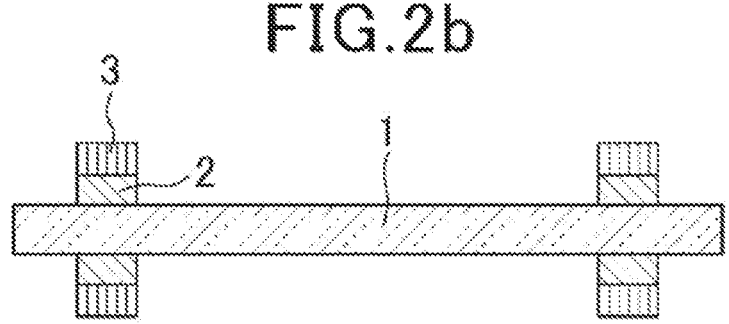
FIG. 2b is a schematic sectional view of a glass film-resin composite according to yet another embodiment of the present invention.

When the resin tapes 3 are laminated to the glass film 1, they may be laminated to only one of opposite surfaces of the glass film 1 (see FIG. 2a), or may be laminated to only each of the opposite surfaces of the glass film 1 (see FIG. 2b).

(Resin Tape)

The resin tape for the glass film-resin composite according to the present invention is formed of any suitable resin material. Examples of a resin for forming the resin tape include polyethylene, polyvinyl chloride, polyethylene terephthalate, polyvinylidene chloride, polypropylene, polyvinyl alcohol, polyester, polycarbonate, polystyrene, polyacrylonitrile, an ethylene vinyl acetate copolymer, an ethylene-vinyl alcohol copolymer, an ethylene-methacrylic acid copolymer, nylon, cellophane, and a silicone resin. Further, with a view to enhancing adhesion with the after-mentioned adhesive layer, the surface of the resin tape may be preliminarily provided with a primer layer serving as an easy-adhesion layer, or may be preliminarily subjected to corona treatment or plasma treatment. Although a component for forming the primer layer is not particularly limited as long as it has sufficient adhesiveness with respect to the resin tape or the after-mentioned adhesive layer, it is possible to suitably use polyester resin, polycarbonate resin, epoxy resin, alkyd resin, acrylic resin, urea resin, and urethane resin. Particularly, in a case where a film substrate comprised of polyester is used, from the view point of adhesiveness, it is more preferable to use a resin selected from the group consisting of polyester resin, acrylic resin, and urethane resin. Further, two different types of resins, e.g., polyester resin and urethane resin, polyester resin and acrylic resin, or acrylic resin and urethane resin, may be used in combination.

In the resin tape for use in the glass film-resin composite according to the present invention, the width l (mm) of the resin tape represented by the following formula (1) is set such that the reinforcement coefficient a (mm*(μm)$^{1/2}$) becomes 1.10 or more, while taking into account the Young's modulus Ep (GPa) and the thickness tp (μm) of the resin tape, and the Young's modulus Eg (GPa) and the thickness tg (μm) of the glass film to be reinforced by the resin tape. In this case, even when a crack is generated at the edge of the glass film, development of the crack can be suppressed by the resin tape.

$$l \equiv a \frac{E_g \sqrt{t_g}}{E_p t_p} \quad (1)$$

(where: a represents a reinforcement coefficient (mm*(μm)$^{1/2}$) which is 1.10 or more; Eg represents the Young's modulus (GPa) of the glass film; Ep represents the Young's modulus (GPa) of the resin tape; tg represents the thickness (μm) of the glass film; and tp represents the thickness (μm) of the resin tape.)

The width l (where there are a plurality of the resin tapes, the width per resin tape) of the resin tape is not particularly limited but may be set to an appropriate value, as long as it satisfies the formula (1). For example, from the viewpoint of efficiently obtaining the glass film, the width l is preferably 60 mm or less, more preferably 50 mm or less, still more preferably 30 mm or less, further preferably 20 mm or less, particularly preferably 10 mm or less. Further, although depending on the width of the glass film, the width l (where there are a plurality of the resin tapes, the width per resin tape) of the resin tape is preferably 1% to 10%, more preferably 1% to 5%, with respect to the width of the glass film. Further, in a case where the resin tape is configured to reinforce the entire surface of the glass film, the width of the resin tape is preferably set in the range of 80% to 110%, more preferably 90% to 100%, with respect to the width of the glass film. A preferred value of the width l of the resin tape 1 in the case where the glass film is a glass ribbon is as described above.

The thickness tp of the resin tape is not particularly limited as long as it satisfies the formula (1). For example, the thickness tp is preferably 2 μm to 200 μm, more preferably 10 μm to 150 μm, still more preferably 20 μm to 100 μm.

The length of the resin tape may be set to any suitable value, depending on the length of the glass film.

The reinforcement coefficient a (mm*(μm)$^{1/2}$) to be adopted in the formula (1) is 1.10 or more, preferably 1.30 or more.

(Adhesive)

Examples of a material for forming an adhesive layer (a layer of an adhesive) for use in laminating the resin tape to the glass film in the glass film-resin composite according to the present invention include an epoxy-based adhesive, a rubber-based adhesive, an acrylic-based adhesive, a silicone-based adhesive and a urethane-based adhesive, and any mixture thereof. As a usable adhesive material, there is a mixture comprising polyurethane, polyvinyl chloride, and vinyl alcohol. There are also epoxy resin, polyvinyl butyral, polymethacrylic acid ester, cyclized rubber, ethyl cellulose, and vinylic copolymer, which have good adhesiveness with respect to the glass film. Further, from the viewpoint of properties, it is particularly preferable to use an adhesive material which is optically transparent in a visible wavelength region. In the viewpoint of curing, it is preferable to cure the adhesive layer by a light curing process, a thermal curing process, or a complex process thereof.

The elastic modulus of the adhesive is preferably 1 GPa or more, more preferably 2 to 10 GPa.

The thickness of the adhesive is preferably 1 µm to 50 µm, more preferably 10 µm to 30 µm.

In the glass film-resin composite according to the present invention, the resin tape is preferably laminated to at least one surface of the glass film through an adhesive having no peelability. In this case, development of a crack can be suppressed by the resin tape even when the width of the resin tape is relatively small, so that it becomes possible to reduce a risk that, when the resin tape is attached (pressure-bonded) to the glass film, a crack is generated in the surface of the glass film.

(Production Method for Glass Film-Resin Composite)

When producing the glass film-resin composite according to the present invention, for example, before laminating the glass film and the resin tape together, the adhesive is first applied onto the glass film or the resin tape. Preferably, while an elongated resin tape is fed out, the adhesive is applied onto the resin tape, to perform lamination between the glass film and the resin film. Examples of a method for the application include: a coating process such as air doctor coating, blade coating, knife coating, reverse coating, transfer roll coating, gravure roll coating, kiss coating, cast coating, spray coating, slot orifice coating, calender coating, electrodeposition coating, dip coating, and die coating; and a printing process such as relief printing (e.g., flexographic printing), intaglio printing (e.g., direct gravure printing or offset gravure printing), planographic printing (e.g., offset printing), and stencil printing (e.g., screen printing). In a case where a curable adhesive is used, after laminating the glass film and the resin tape together, a layer of the adhesive can be cured. Examples of a method for the curing include a curing process based on ultraviolet irradiation and/or heating. As a condition for ultraviolet irradiation, a cumulative amount of the irradiation light is typically 100 mj/cm$^2$ to 2000 mj/cm$^2$, preferably 200 mj/cm$^2$ to 1000 mj/cm$^2$.

EXAMPLES

Although the present invention will now be more specifically described by taking examples, it should be noted that the present invention is not limited to such examples.

(Production of Glass-Reinforcing Resin Tape)

A plurality of glass-reinforcing resin tapes each having one of combinations of different widths 1 (3, 5, 10, 20, 25 and 50 mm) and different thicknesses tp (25 and 100 µm), and a length of 100 mm, were produced, using a resin comprising polyethylene terephthalate, cycloolefin, and polypropylene, and a round blade slitter.

For determining the Young's modulus of each of the resin tapes, a strip-shaped resin sample having a thickness of 50 µm, a width of 2 cm and a length of 15 cm was produced, using the same resin comprising polyethylene terephthalate, cycloolefin and polypropylene, as that used for producing the resin tapes, longitudinal elongation and stress of the strip-shaped resin sample at 25° C. were measured, using a tester Autograph (AG-1 manufactured by Shimadzu Corporation). As test conditions, an inter-chuck distance and a pulling rate were set, respectively, to 10 cm, and 10 mm/min. Then, the Young's modulus Ep (GPa) of each of the resin tapes was calculated based on a value of the Young's modulus of the strip-shaped resin sample, and the size of each of the resin tapes.

(Preparation of Glass Film)

Two types of glass films (OA10 manufactured by Nippon Electric Glass Co., Ltd., size: 100 mm×60 mm, thickness: 50 µm and 100 µm) were prepared. The Young's moduluses Ep (GPa) of the glass films were identified by a resonance method.

(Preparation of Adhesive)

An epoxy-based resin (CELLOXIDE 2021P manufactured by Daicel Corp.), an epoxy-based resin (EHPE3150 manufactured by Daicel Corp.), an oxetane-based resin (ARON OXETANE OXT-221 manufactured by Toagosei Co., Ltd.), an epoxy group-terminated coupling agent (KBM-403 manufactured by Shin-Etsu Chemical Co., Ltd.) and a polymerization initiator (CPI101A manufactured by San-Apro Ltd.) were mixed at a ratio of 60:10:20:4:2 to prepare an ultraviolet-curable adhesive.

Inventive Examples 1 to 22

(Production of Glass Film-Resin Composite Test Pieces)

Using the prepared glass films and the resin tapes produced in the above manner, a plurality of combinations each providing a reinforcement coefficient a (mm*(µm)$^{1/2}$) of 1.10 or more in the following formula were prepared.

$$l \equiv a \frac{E_g \sqrt{t_g}}{E_p t_p}$$

(where: a represents a reinforcement coefficient (mm*(µm)$^{1/2}$); Eg represents the Young's modulus (GPa) of the glass film; Ep represents the Young's modulus (GPa) of the resin tape; tg represents the thickness (µm) of the glass film; and tp represents the thickness (µm) of the resin tape.)

Each of the glass-reinforcing resin tapes was attached to one surface of each of the glass films through the prepared adhesive. The glass-reinforcing resin tape was attached at a position away from a long side of the glass film by 20 mm, such that a longitudinal direction of the resin tape becomes parallel to the long side of the glass film. More specifically, the adhesive was applied onto the one surface of the glass film to have a thickness of 5 µm, and the glass-reinforcing resin tape was attached thereonto. Then, the adhesive was cured by irradiation with ultraviolet light (wavelength: 365 nm, intensity: 1000 mj/cm$^2$ or more) from a high-pressure mercury lamp, to bond the glass-reinforcing resin tape to the glass film, thereby producing a glass film-resin composite test piece.

(Evaluation of Reinforcement Effect in Each Glass Film-Resin Composite Test Piece)

With regard to each of the produced glass film-resin composite test pieces, an effect of reinforcing the glass film by the glass-reinforcing resin tape was evaluated in the following manner.

The glass film-resin composite test piece was placed on a roll having an outer diameter of 3 inch in a posture where the glass-reinforcing resin tape faces outwardly, and opposite short-side ends of the glass film-resin composite test piece was fixed to the roll along a curved surface of the roll. In this state, a small crack was formed at the middle of a long-side edge of the glass film by a protruding member. Thus, glass fracture propagation occurs toward the glass-reinforcing resin tape in a direction perpendicular to the direction of curvature of the glass film. Then, it was visually evaluated whether the fracture propagation is promoted such that the crack in the glass plate penetrates through the glass-reinforcing resin tape, or is halted within the tape. Then, a test piece in which the crack penetrates through the tape to cause fracture of the glass film was evaluated as X, and a test piece in which the penetration was blocked was evaluated as ◯.

Comparative Examples 1 to 13

Except that, using the glass films and the resin tapes, a plurality of combinations each providing a reinforcement coefficient a (mm*(μm)$^{1/2}$) of less than 1.10 in the following formula were prepared, glass film-resin composite test pieces were produced and evaluated in terms of the reinforcement effect, in the same manner as that for Inventive Examples.

The glass film-resin composite test pieces, and measurement values and evaluation results of the test pieces, obtained in Inventive and Comparative Examples are presented in Table 1.

TABLE 1

|  | a | l (mm) | Ep (Gpa) | tp (um) | Eg (GPa) | tg (um) | Evaluation Result |
|---|---|---|---|---|---|---|---|
| Inventive Example 1 | 1.75 | 3 | 4.2 | 100 | 72 | 100 | ○ |
| Inventive Example 2 | 2.92 | 5 | 4.2 | 100 | 72 | 100 | ○ |
| Inventive Example 3 | 5.83 | 10 | 4.2 | 100 | 72 | 100 | ○ |
| Inventive Example 4 | 11.67 | 20 | 4.2 | 100 | 72 | 100 | ○ |
| Inventive Example 5 | 14.58 | 25 | 4.2 | 100 | 72 | 100 | ○ |
| Inventive Example 6 | 29.17 | 50 | 4.2 | 100 | 72 | 100 | ○ |
| Inventive Example 7 | 1.53 | 5 | 2.2 | 100 | 72 | 100 | ○ |
| Inventive Example 8 | 3.06 | 10 | 2.2 | 100 | 72 | 100 | ○ |
| Inventive Example 9 | 6.11 | 20 | 2.2 | 100 | 72 | 100 | ○ |
| Inventive Example 10 | 7.64 | 25 | 2.2 | 100 | 72 | 100 | ○ |
| Inventive Example 11 | 15.28 | 50 | 2.2 | 100 | 72 | 100 | ○ |
| Inventive Example 12 | 2.06 | 10 | 4.2 | 25 | 72 | 50 | ○ |
| Inventive Example 13 | 4.12 | 20 | 4.2 | 25 | 72 | 50 | ○ |
| Inventive Example 14 | 5.16 | 25 | 4.2 | 25 | 72 | 50 | ○ |
| Inventive Example 15 | 10.31 | 50 | 4.2 | 25 | 72 | 50 | ○ |
| Inventive Example 16 | 1.39 | 20 | 0.5 | 100 | 72 | 100 | ○ |
| Inventive Example 17 | 1.74 | 25 | 0.5 | 100 | 72 | 100 | ○ |
| Inventive Example 18 | 3.47 | 50 | 0.5 | 100 | 72 | 100 | ○ |
| Inventive Example 19 | 1.46 | 10 | 4.2 | 25 | 72 | 100 | ○ |
| Inventive Example 20 | 2.92 | 20 | 4.2 | 25 | 72 | 100 | ○ |
| Inventive Example 21 | 3.65 | 25 | 4.2 | 25 | 72 | 100 | ○ |
| Inventive Example 22 | 7.29 | 50 | 4.2 | 25 | 72 | 100 | ○ |
| Comparative Example 1 | 0.88 | 1.5 | 4.2 | 100 | 72 | 100 | X |
| Comparative Example 2 | 0.44 | 1.5 | 2.1 | 100 | 72 | 100 | X |
| Comparative Example 3 | 0.88 | 3 | 2.1 | 100 | 72 | 100 | X |
| Comparative Example 4 | 0.31 | 1.5 | 4.2 | 25 | 72 | 50 | X |
| Comparative Example 5 | 0.62 | 3 | 4.2 | 25 | 72 | 50 | X |
| Comparative Example 6 | 1.03 | 5 | 4.2 | 25 | 72 | 50 | X |
| Comparative Example 7 | 0.10 | 1.5 | 0.5 | 100 | 72 | 100 | X |
| Comparative Example 8 | 0.21 | 3 | 0.5 | 100 | 72 | 100 | X |
| Comparative Example 9 | 0.35 | 5 | 0.5 | 100 | 72 | 100 | X |
| Comparative Example 10 | 0.69 | 10 | 0.5 | 100 | 72 | 100 | X |
| Comparative Example 11 | 0.22 | 1.5 | 4.2 | 25 | 72 | 100 | X |
| Comparative Example 12 | 0.44 | 3 | 4.2 | 25 | 72 | 100 | X |
| Comparative Example 13 | 0.73 | 5 | 4.2 | 25 | 72 | 100 | X |

As is clear from the above results, the present invention makes it possible to enable fracture propagation starting from a crack formed in the glass film to be halted within the resin tape. Thus, the present invention can be applied to a glass ribbon so as to obtain a long-length (e.g., 500 m or more-long) glass roll.

LIST OF REFERENCE SIGNS

1: glass film
2: adhesive
3: resin tape

The invention claimed is:

1. A glass film-resin composite comprising:
a glass film having a first surface and a second surface opposite the first surface; and
a resin tape laminated to the first surface of the glass film through an adhesive, wherein
the second surface of the glass film is free from having the resin tape, and
the width l (mm) of the resin tape satisfies the following formula (1);

$$l \equiv a \frac{E_g \sqrt{t_g}}{E_p t_p} \tag{1}$$

(where: a represents a reinforcement coefficient (mm* (μm)$^{1/2}$) which is 1.10 or more; Eg represents the Young's modulus (GPa) of the glass film; Ep represents the Young's modulus (GPa) of the resin tape; tg represents the thickness (μm) of the glass film; and tp represents the thickness (μm) of the resin tape),
wherein
the resin tape has a width of 2.5% to less than 5% the width of the glass film, and
the thickness tg of the glass film is 200 μm or less.

2. The glass film-resin composite as recited in claim 1, wherein the glass film is a glass ribbon.

3. The glass film-resin composite as recited in claim 2, wherein a plurality of the resin tapes are laminated to the first surface of the glass film such that the plurality of the resin tapes are provided in the vicinity of each of width-directional opposite edges of the glass ribbon, in spaced-apart relation to each other.

4. The glass film-resin composite as recited in claim 1, wherein the resin tape is laminated to the at least one surface of the glass film through an adhesive having no peelability.

5. The glass film-resin composite as recited in claim 1, wherein the width l (mm) of the resin tape is 60 mm or less.

6. The glass film-resin composite as recited in claim 1, wherein the adhesive has an elastic modulus of 1 GPa or more.

7. The glass film-resin composite as recited in claim 1, which is used for producing a glass roll.

8. The glass film-resin composite as recited in claim 1, wherein the resin tape is provided such that a longitudinal direction of the resin tape becomes parallel to the long side of the glass film.

9. The glass film-resin composite as recited in claim 7, wherein the glass roll has a length of at least 500 meters.

10. A glass film-resin composite comprising:
a glass film; and
a plurality of the resin tapes are laminated to at least one surface of the glass film, wherein the width l (mm) of the resin tape satisfies the following formula (1);

$$l \equiv a \frac{E_g \sqrt{t_g}}{E_p t_p} \qquad (1)$$

(where: a represents a reinforcement coefficient (mm* (μm)$^{1/2}$) which is 1.10 or more; Eg represents the Young's modulus (GPa) of the glass film; Ep represents the Young's modulus (GPa) of the resin tape; tg represents the thickness (μm) of the glass film; and tp represents the thickness (μm) of the resin tape),
each of the resin tapes has a width of 1% to less than 5% the width of the glass film,
each of the resin tapes has a width of less than 5 mm.

* * * * *